US009248808B2

(12) United States Patent
Moll et al.

(10) Patent No.: US 9,248,808 B2
(45) Date of Patent: Feb. 2, 2016

(54) HEATED WIPER ASSEMBLY

(71) Applicant: TRICO PRODUCTS CORPORATION, Rochester Hills, MI (US)

(72) Inventors: Kyle Moll, Oxford, MI (US); Andrew Ehde, Oxford, MI (US); John Foss, Troy, MI (US); Roger H. Barnett, Grand Blanc, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 163 days.

(21) Appl. No.: 13/869,202

(22) Filed: Apr. 24, 2013

(65) Prior Publication Data

US 2014/0317873 A1    Oct. 30, 2014

(51) Int. Cl.
*B60S 1/38* (2006.01)

(52) U.S. Cl.
CPC ............... *B60S 1/3805* (2013.01); *B60S 1/381* (2013.01); *B60S 1/3889* (2013.01); *B60S 1/3803* (2013.01); *B60S 1/3806* (2013.01); *B60S 1/3858* (2013.01); *B60S 1/3881* (2013.01)

(58) Field of Classification Search
CPC ...... B60S 1/381; B60S 1/3803; B60S 1/3805; B60S 1/3806
USPC ............................ 15/250.201, 250.07, 250.43
See application file for complete search history.

(56) References Cited

U.S. PATENT DOCUMENTS

| | | | |
|---|---|---|---|
| 2,034,880 A | 3/1936 | Sackett | |
| 2,443,849 A | 6/1948 | Childs | |
| 2,656,448 A | 10/1953 | Lentz | |
| 2,721,351 A | 10/1955 | Nitzel et al. | |
| 2,746,077 A | 5/1956 | Higgins | |
| 3,530,525 A | 9/1970 | Abel | |
| 4,194,261 A | 3/1980 | Parkinson | |
| 4,497,083 A | 2/1985 | Nielsen, Jr. et al. | |
| 5,325,561 A | 7/1994 | Kotlar | |
| 5,649,337 A | 7/1997 | Lobner | |
| 5,749,118 A | 5/1998 | Holland | |
| 5,787,543 A | 8/1998 | Selders | |
| 5,791,010 A | 8/1998 | Brady et al. | |
| 5,826,293 A | 10/1998 | Holland | |

(Continued)

FOREIGN PATENT DOCUMENTS

| | | |
|---|---|---|
| WO | 2011/098261 A1 | 8/2011 |
| WO | 2012/089552 A1 | 7/2012 |

OTHER PUBLICATIONS

Aug. 25, 2014 International Search Report for PCT/US2014/034884.

*Primary Examiner* — Monica Carter
*Assistant Examiner* — Michael Jennings
(74) *Attorney, Agent, or Firm* — Howard & Howard Attorneys PLLC

(57) ABSTRACT

A heated wiper assembly includes a wiping element adapted to contact a surface to be wiped. The heated wiper assembly also includes at least one elongated beam acting to support the wiping element. The heated wiper assembly further includes a pair of end caps operatively mounted to ends of the beam and an airfoil operatively mounted to the beam and extending between the end caps. The heated wiper assembly includes a plurality of heating elements extending longitudinally along lateral sides of the airfoil adjacent the wiping element to heat the wiping element to resist snow and ice build-up on the wiper assembly.

13 Claims, 8 Drawing Sheets

(56) References Cited

U.S. PATENT DOCUMENTS

| | | | |
|---|---|---|---|
| 6,028,291 A | 2/2000 | Heisler | |
| 6,058,554 A | 5/2000 | Warren | |
| 6,236,019 B1 | 5/2001 | Piccione et al. | |
| 6,754,933 B1 | 6/2004 | Pettersson | |
| 6,779,222 B2 | 8/2004 | Tobias | |
| 7,503,095 B2 * | 3/2009 | Lin et al. | 15/250.43 |
| 7,721,382 B2 | 5/2010 | Malone | |
| 7,979,948 B2 * | 7/2011 | Chou | 15/250.201 |
| 8,191,198 B2 | 6/2012 | Egner-Walter et al. | |
| 8,327,496 B2 * | 12/2012 | Kim | 15/250.07 |
| 8,533,900 B2 * | 9/2013 | Huang | 15/250.43 |
| 2006/0037167 A1 * | 2/2006 | Nacamuli | 15/250.201 |
| 2006/0179597 A1 * | 8/2006 | Hoshino et al. | 15/250.43 |
| 2008/0052865 A1 * | 3/2008 | Chiang | 15/250.43 |
| 2009/0100626 A1 | 4/2009 | Kim | |
| 2010/0218333 A1 * | 9/2010 | Ritt | 15/250.201 |
| 2010/0242204 A1 * | 9/2010 | Chien | 15/250.201 |
| 2011/0302738 A1 | 12/2011 | Egner-Walter et al. | |
| 2012/0005855 A1 | 1/2012 | Egner-Walter et al. | |
| 2012/0117746 A1 | 5/2012 | Egner-Walter et al. | |
| 2012/0167326 A1 | 7/2012 | Egner-Walter et al. | |
| 2012/0291216 A1 | 11/2012 | Schauble et al. | |

* cited by examiner

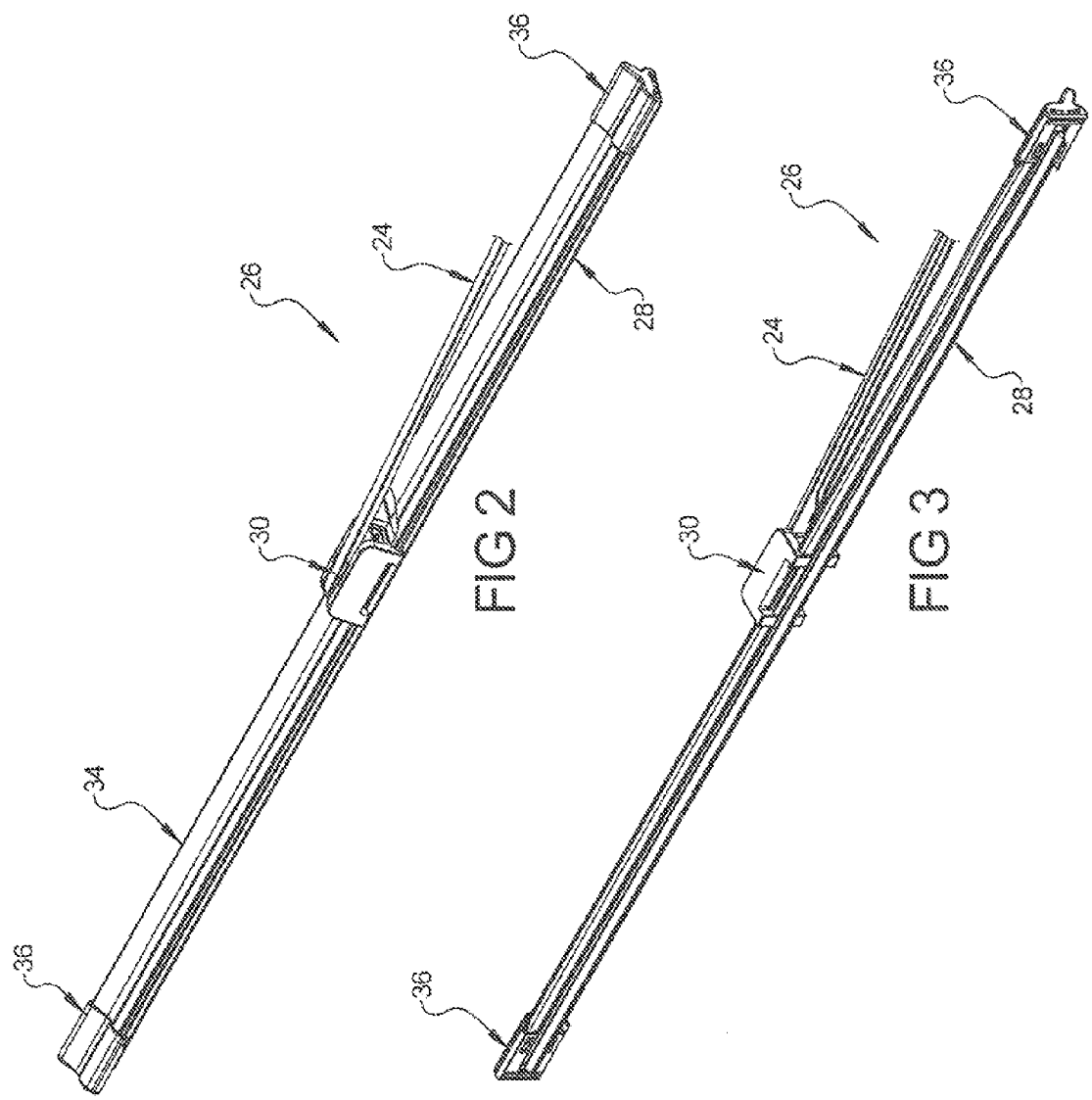

HEATED WIPER ASSEMBLY

BACKGROUND OF THE INVENTION

1. Field of the Invention

The present invention relates generally to wiper assemblies for vehicles and, more specifically, to a heated wiper assembly for a vehicle.

2. Description of the Related Art

Conventional wiper assemblies for vehicles known in the related art include some type of wiper assembly mounted to a wiper arm which, in turn, is mounted adjacent a surface to be wiped such as a windshield of the vehicle and pivotally driven to impart reciprocal motion to the wiper assembly across the windshield. The wiper assembly typically includes a rubber wiping element that contacts the windshield across the surface to be wiped. The wiper assembly often incorporates one or more metal strips that act to reinforce the wiping element and facilitate wiping contact by the wiping element across what is typically a curved glass surface. In this context, the wiper arm delivers a downward force to the wiper assembly that is distributed thereacross pressing the wiper assembly into contact with the windshield. The wiper assembly may also include an airfoil and a pair of end caps located at the distal ends of the wiper assembly.

Currently, for winter driving conditions, snow and ice typically accumulate on the wiper assembly, which is undesired. In freezing conditions where water is present in liquid form either from the environment such as sleet, rain or road slush, or introduced by melting ice and snow on the windshield, the wiping element has a tendency to ice up. When the wiping element is iced up, in particular around a hinge and wipe lip of the wiping element, the effectiveness to clear the glass surface is severely impaired. In some cases, the wiping element can freeze to the glass surface and cause damage to the wiper system when subjected to loading from the wiper arm when the wiper system is turned on or activated. Severe impairment or damage to the wiper assembly could result in a loss of clear vision by the driver and potentially dangerous operating conditions.

Current state of the art of heated wiper blades utilize the following methods for applying heat to the blades: 1) heater wire inside the rubber wiping element; 2) heated film paper laid on top of the metal strips; and 3) heated wires adhered directly to the top of the metal strips. In the case of heater wire inside the rubber wiping element, this posses an issue with wipe quality because the rubber wiping element stiffness is affected due to the internal wire adding ridged or near ridged support inside the cross-section of the wiping element. This can also pose issues with non-reversal at either end of blade travel or non-conformance to curvature variation in windshield profile. In the case of heated film paper laid on top of the metal strips, this can pose issues with heat transfer due to misplacement of heated carrier. It also adds additional labor and can increase cost associated with adding such parts and does not necessarily allow for proper heat transfer to the very end of the rubber wiping element. In the case of heated wires adhered directly to the top of the metal strips, this can be very costly to process. It also does not allow for a connection around the end of the rubber wiping element and thus may allow for an ice build up around the tip of the rubber wiping element. Therefore, there is a need in the art to provide for an effective heating of the wiping element to preclude snow and ice buildup on the wiper assembly during winter driving conditions.

SUMMARY OF THE INVENTION

The present invention overcomes the disadvantages in the related art in a heated wiper assembly including a wiping element adapted to contact a surface to be wiped. The heated wiper assembly also includes at least one elongated beam acting to support the wiping element. The heated wiper assembly further includes a pair of end caps operatively mounted to longitudinal ends of the beam and an airfoil operatively mounted to the beam and extending between the end caps. The heated wiper assembly includes a plurality of heating elements extending longitudinally along lateral sides of the airfoil adjacent the wiping element to heat the wiping element to resist snow and ice build-up on said wiping assembly.

In this way, the heated wiper assembly of the present invention has better heat targeting by moving the heat source location to a functional side of the wiping element and directing it into the hinge and in close proximity to the wipe lip of the wiping element. In addition, the heated wiper assembly of the present invention provides lower manufacturing complexity, resulting in a potential lower cost and improved quality and reliability of the heated wiper assembly. The heated wiper assembly of the present invention retains rubber wiping element peak performance by not adding unnecessary structure to the wiping element that can alter performance of the wiper assembly in the winter weather in an undesired way. The heated wiper assembly of the present invention is used for beam type wiper blades for ice and snow removal. The heated wiper assembly of the present invention can be used for wiper systems in any type of transportation from automotive vehicles, heavy-duty trucks, trains, air planes, ships, large construction vehicles, or military vehicles or any other type of vehicle that contains surface wiper systems in winter weather. Further, the heated wiper assembly of the present invention applies heat closer to a failure point location (hinge and wipe lip) of the wiping element, which will allow a more direct heat source to problem areas, thereby resisting snow and ice buildup.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 2 is an enlarged top perspective view of the heated wiper assembly according to one embodiment of the present invention.

FIG. 3 is an enlarged bottom perspective view of the heated wiper assembly according to one embodiment of the present invention.

DETAILED DESCRIPTION OF THE PREFERRED EMBODIMENT(S)

Figure 1:
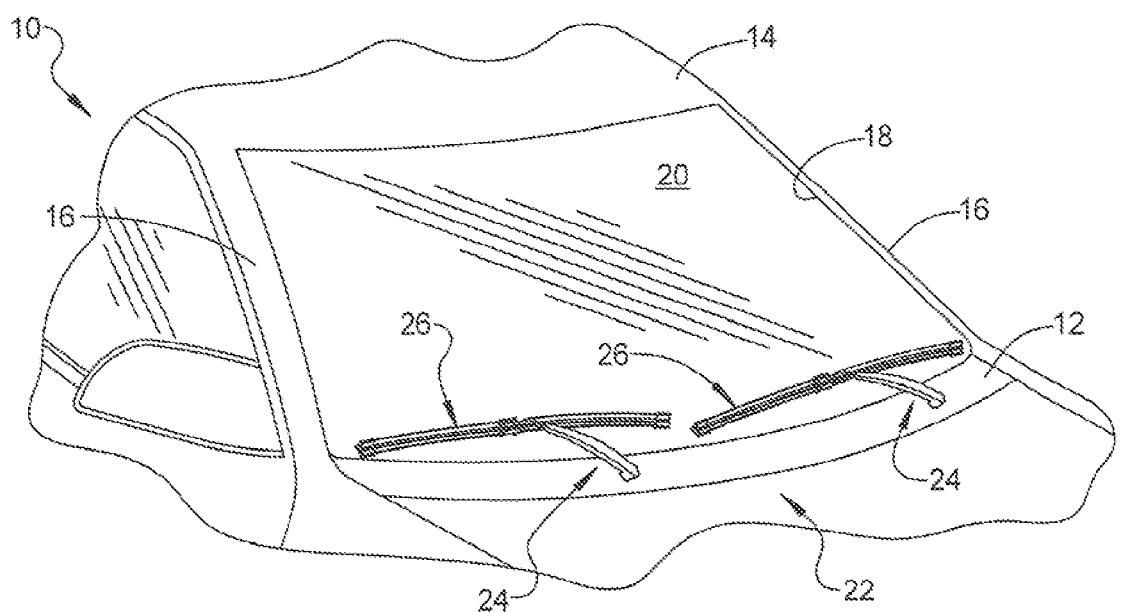
FIG. 1 is a partial perspective view of a front of a vehicle having a pair of heated wiper assemblies, according to one embodiment of the present invention, pivotally mounted for reciprocal movement across a windshield of the vehicle.
Figure 4:
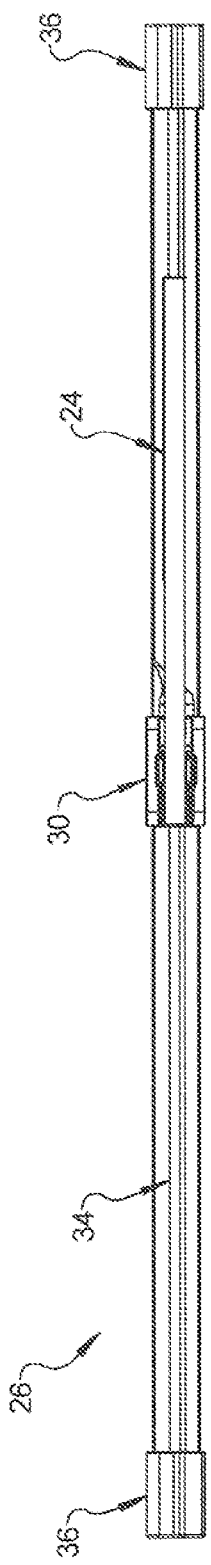
FIG. 4 is a top view of the heated wiper assembly according to one embodiment of the present invention.
Figure 5:
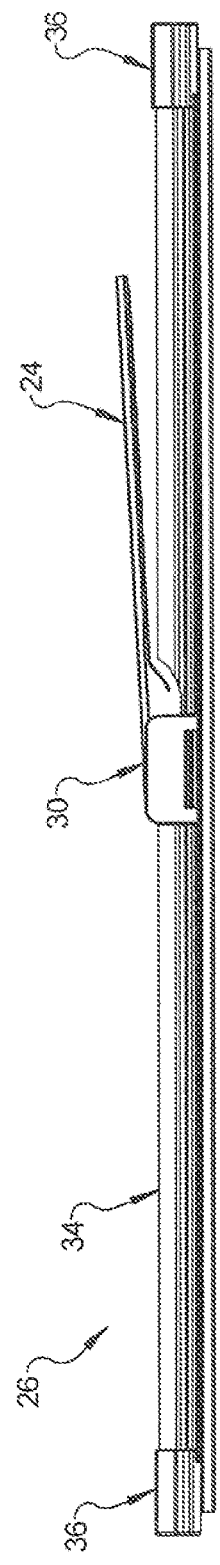
FIG. 5 is a side view of the heated wiper assembly according to one embodiment of the present invention.
Figure 6:
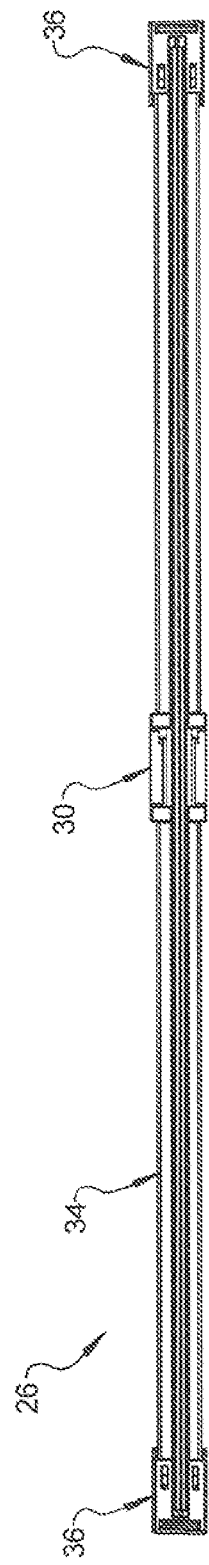
FIG. 6 is a bottom view of the heated wiper assembly according to one embodiment of the present invention.
Figure 7:
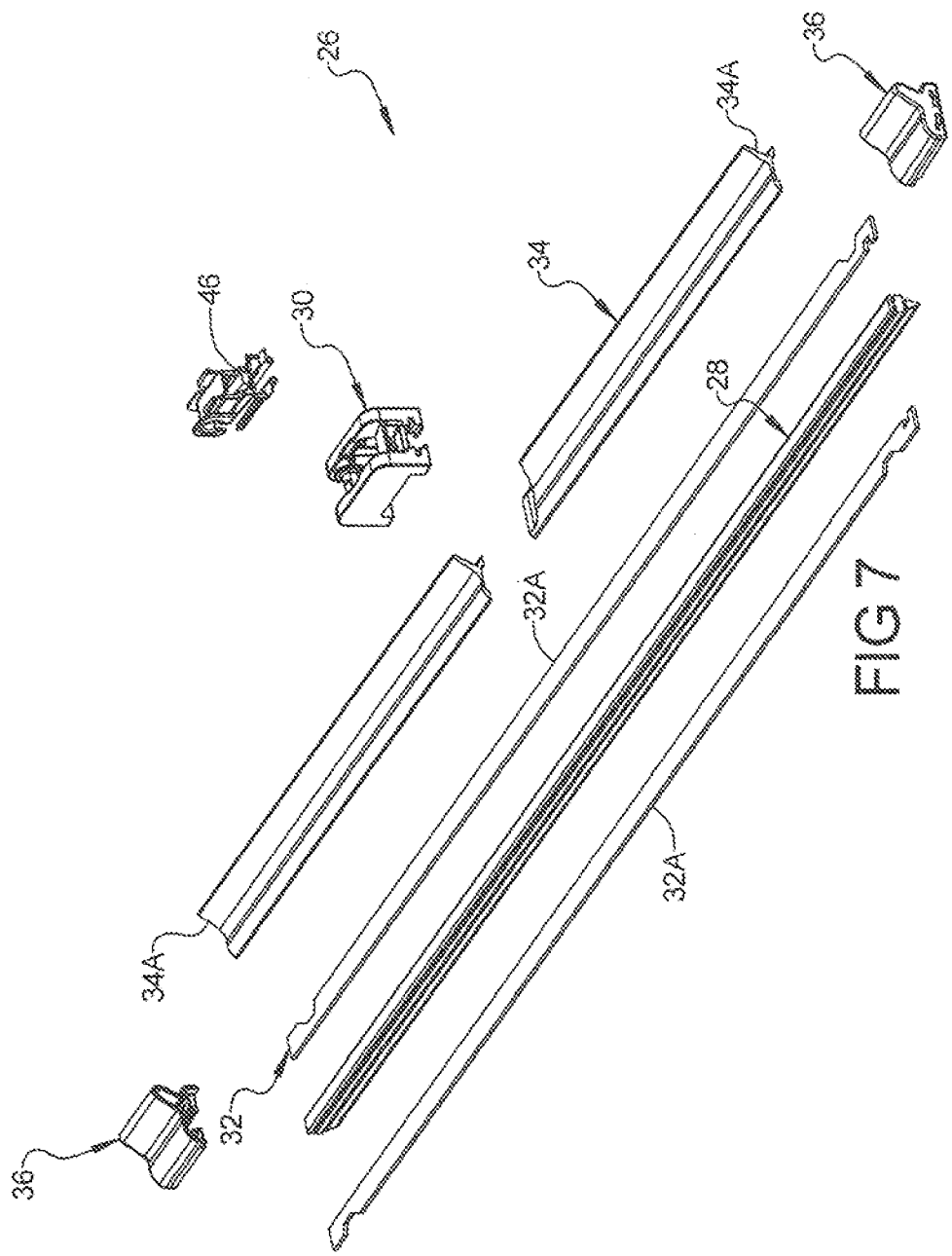
FIG. 7 is an exploded perspective view of the heated wiper assembly according to one embodiment of the present invention.

Referring now to the figures, where like numerals are used to designate like structure, a portion of a vehicle is schematically illustrated at 10 in FIG. 1. The vehicle 10 includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20. As illustrated, the vehicle 10 is an automotive vehicle, but may be any type of vehicle such as heavy-duty trucks, trains, air planes, ships, large construction vehicles, or military vehicles or any other type of vehicle that contains surface wiper systems in winter weather.

A wiper system is generally indicated at 22 in FIG. 1 and is employed to clean the windshield 20. The wiper system 22 includes a pair of wiper arms, generally indicated at 24, and a pair at heated wiper assemblies, according to the present invention and generally indicated at 26, which correspond to the driver and passenger side of the vehicle 10. However, those having ordinary skill in the art will appreciate that the wiper system 22 could employ a single wiper arm 24 and a single heated wiper assembly 26 without departing from the scope of the present invention.

In the representative example illustrated herein, each heated wiper assembly 26 is carried by a corresponding wiper arm 24. The wiper arm 24 includes an attachment member (not shown but generally known in the art) adapted to operatively engage the heated wiper assembly 26. The wiper system 22 also includes an electrical motor (not shown but generally known in the art) to move the heated wiper assemblies 26 in an oscillating manner across the surface of the windshield 20.

While the heated wiper assembly 26 illustrated in FIG. 1 is shown in connection with the front windshield 20 of the vehicle 10, those having ordinary skill in the art will appreciate that heated wiper assemblies 26 may be employed in other areas of the vehicle 10, such as a rear window (not shown) or a head lamp (not shown) that employs a wiper system. Thus, it will be understood that the present invention is not limited for use solely in connection with wiper arms 24 adapted for use on a vehicle's windshield 18, but for use in all applications where wiper arms 24 are employed.

Referring to FIGS. 2 through 8, the heated wiper assembly 26 includes a wiping element, generally indicated at 28, that is adapted to contact the surface of the vehicle 10 to be wiped, in this representative example, the windshield 20. In addition, the heated wiper assembly 28 generally includes a coupler assembly, generally indicated at 30, that acts to interconnect the wiper arm 24 and the wiping element 28. The heated wiper assembly 26 also includes at least one elongated beam, generally indicated at 32, that defines a longitudinal axis and that acts to support the wiping element 28. In the representative embodiment illustrated herein, the beam 32 includes a pair of rails or splines, generally indicated at 32A, that are operatively supported in the wiping element 28. However, those having ordinary skill in the art will appreciate from the description that follows that the beam 32 may be either monolithic or defined by the pair of rails 32A. The heated wiper assembly 26 may also include an airfoil assembly, generally indicated at 34, and a pair of end caps, generally indicated at 36, both according to one embodiment of the present invention. Each of these components will be described in greater detail below.

As best shown in FIGS. 2 through 8, the wiping element 28 includes an upper section 38 and a lower section 40 that are partitioned by a longitudinally extending bridge or hinge section 42. The hinge section 42 provides flexibility between the upper section 38 and lower section 40 during operational movement of the heated wiper assembly 26 across the surface to be wiped. The upper section 38 includes a pair of grooves, generally indicated at 44, extending in the direction of the longitudinal axis of the wiping element 28. The grooves 44 are disposed on either side of the wiping element 28 and have laterally extending open ends disposed on opposite sides of the wiping element 28 with respect to each other. Each rail 32A is adapted to be received in a snug fashion in a corresponding one of the grooves 44 formed on the upper section 38 of the wiping element 28. The wiping element 28 includes a predetermined length corresponding to particular application and is often manufactured through an extrusion process, which enables the length of the wiping element 28 to be easily adjusted without a substantial increase to manufacturing expense. Furthermore, while the wiping element 28 of the present invention is constructed from a flexible rubber, those having ordinary skill in the art will appreciate that it may be constructed from any flexible material such as silicone or other polymer without departing from the scope of the present invention.

The beam 32 may be constructed from a resiliently flexible material, such as spring steel or a polymer, and is adapted to apply force from an intermediate position between its longitudinal ends. More specifically, the beam 32 receives force from the spring-loaded wiper arm 24 at an intermediate position and distributes this force across the span of the beam 32 toward its longitudinal ends. To that end, the beam 32 may be curved longitudinally with a predetermined radius of curvature. This predetermined radius of curvature is sometimes referred to in the related art as a "free form" radius of curvature. Accordingly, the curvature of the beam 32 may be symmetrical or asymmetrical depending on the force requirements and the contour of the windshield 20. The flexible, free form, pre-curved beam 32 straightens out when the wiper arm 24 applies a force thereto to flatten the beam 32 and directs the wiping element 28 to contact the windshield 20. Thus, the elongated beam 32 includes a free-form curvature that ensures force distribution on windshields having various curvatures that effects proper wrapping about the windshield 20.

As illustrated throughout the figures, the beam 32 has a substantially constant width and may have a constant thickness throughout the length between its longitudinal ends. The constant width and thickness are adapted to provide high lateral and torsional stiffness to avoid lateral and torsional deflection, which causes the wiping element 28 to stick/slip ("chatter") on the windshield 20 during operation. Thus, the cross-section of the beam 32 has a generally rectangular outer profile that makes the elongated beam 32 easier to manufacture. More specifically, where the beam 32 is constructed from metal, such as spring steel, the tools and machinery used to manufacture the beam 32 are less complicated than that required to manufacture having varying widths and/or thicknesses. Furthermore, where the beam 32 is constructed from a polymer, such as a thermoplastic elastomer, the tools and extrusion process machinery are also less complicated than those employed to manufacture beams having varying widths and/or thicknesses. However, those having ordinary skill in the art will appreciate that the beam 32 illustrated herein may include a varying thickness and/or width without departing from the scope of the present invention.

As noted above, the heated wiper assembly 26 also includes a coupler assembly, generally indicated at 30. The coupler assembly 30 is adapted to connect the heated wiper assembly 26 to the wiper arm 24. More specifically, those having ordinary skill in the art will appreciate that different OEM's employ wiper arm assemblies having different attachment members adapted to operatively engage a specific wiper assembly. Accordingly, the coupler assembly 30 illustrated herein includes structure that operatively engages at least one or more of these different attachment members. Further by way of example, certain wiper arms employed by OEM's include "bayonet-style"; "pin-type"; or "hook-type" attachment members of various sizes that operatively engage the wiper assemblies. Accordingly, the coupler assembly 30 illustrated herein may include an adapter 46 (FIG. 7) for operatively engaging at least one or more of these different attachment members for use in connection with the heated wiper assemblies 26 without departing from the scope of the present invention.

As previously noted, the heated wiper assembly 26 includes the airfoil, generally indicated, at 34 and according to one embodiment of the present invention. The airfoil 34 is operatively mounted to the beam 32. The airfoil 34 extends between each of the pair of end caps 36. The airfoil 34 acts to reduce the likelihood of wind lift by allowing air to flow over the heated wiper assembly 26. More specifically, and in the embodiment illustrated herein, the airfoil 34 includes a pair of airfoil components 34A that are operatively mounted to the beam 32 and extend between the coupler 30 and each of the pair of end caps 36. However, those having ordinary skill in the art will appreciate that the airfoil 34 may be defined by a single unitary component without departing from the scope of the present invention.

Figure 8:
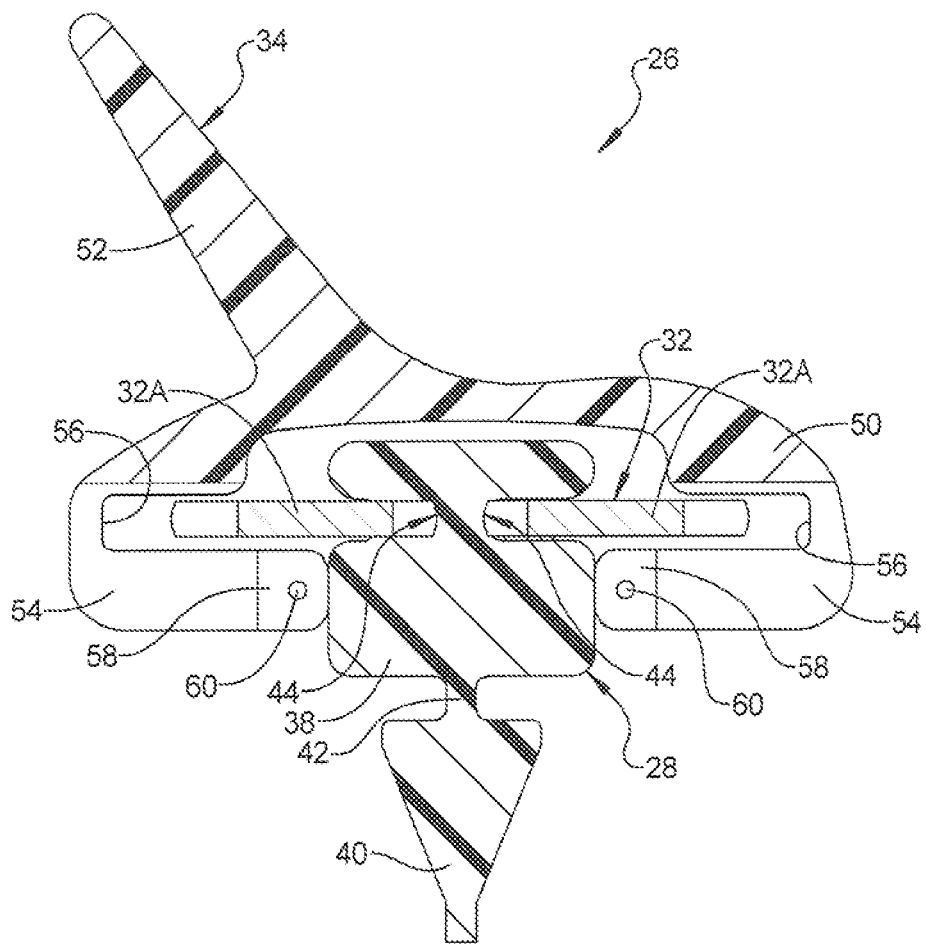
FIG. 8 is cross-sectional view of the heated wiper assembly according to one embodiment of the present invention.
Figure 9:
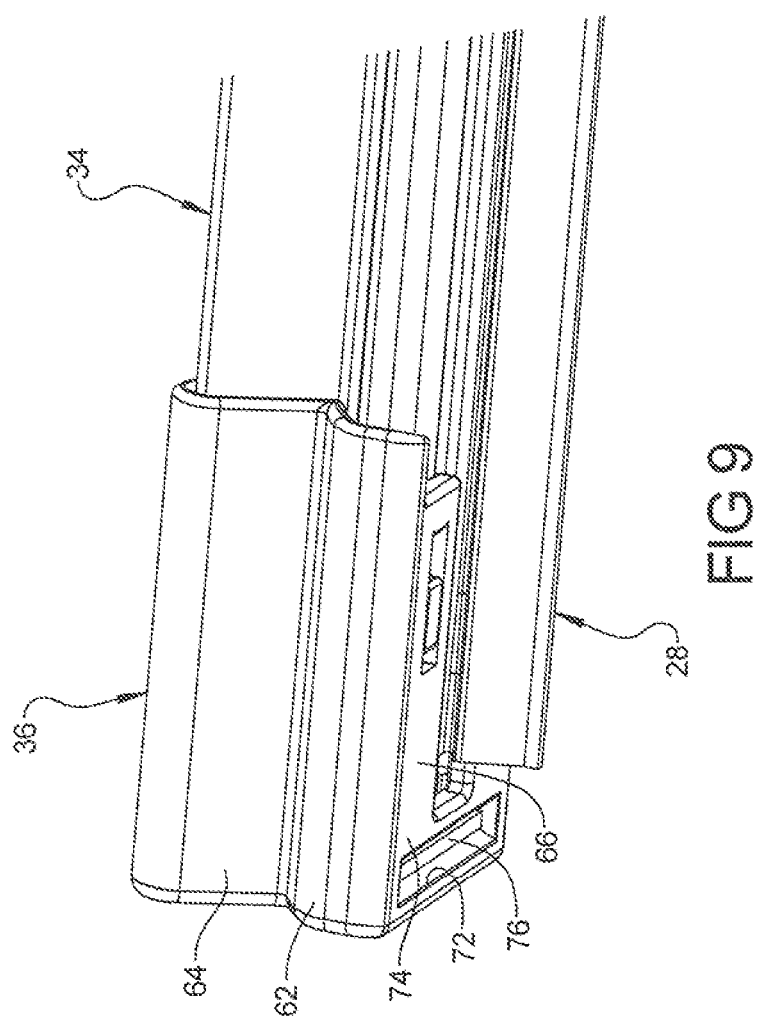
FIG. 9 is a partial perspective view of the heated wiper assembly according to one embodiment of the present invention.
Figure 10:
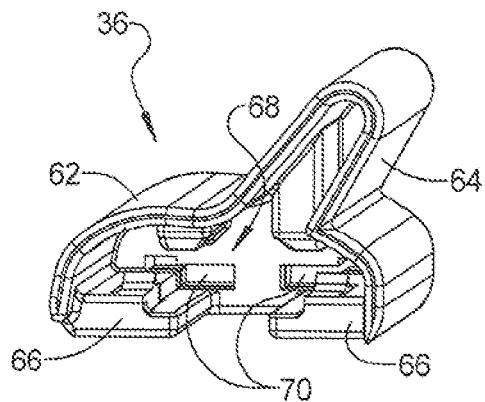
FIG. 10 is an end perspective view of an end cap of the heated wiper assembly according to one embodiment of the present invention.
Figure 11:
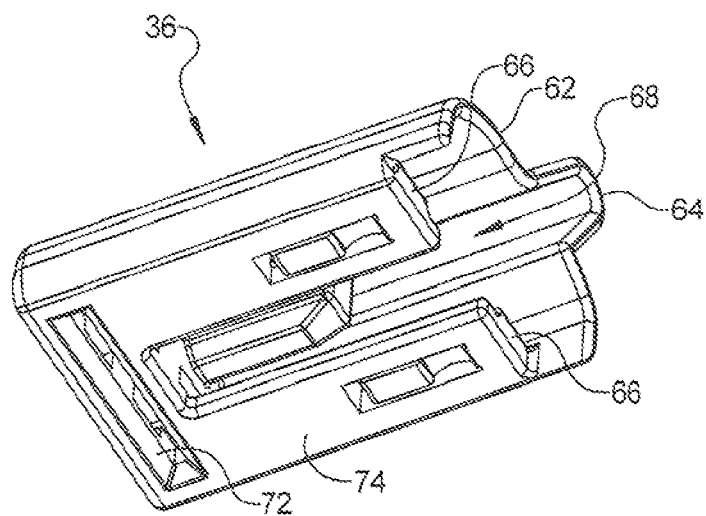
FIG. 11 is a bottom perspective view of an end cap of the heated wiper assembly according to one embodiment of the present invention.
Figure 12:
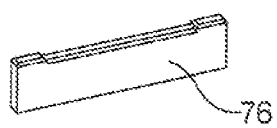
FIG. 12 is a perspective view of an end cap connector of the heated wiper assembly according to one embodiment of the present invention.

Referring to FIG. 8, each of the airfoil components 34A includes a body 50 extending longitudinally. Each of the airfoil components 34A includes a spoiler 52 that tapers outwardly from the body 50 toward a terminal point to define a profile that is slightly contoured. Each of the airfoil components 34A includes inwardly extending legs 54 forming grooves 56 between the body 50 and the legs 54. The tears 54 may have a durometer harder than a durometer of the body 50 to create a dual durometer airfoil 34. For example, the legs 54 may have a durometer of 50 Shore D and the body 50 may have a durometer of 67 Shore A. In addition, each of the airfoil components 34A may be manufactured through an extrusion process. However, those having ordinary skill in the art will appreciate that the airfoil 34 may be manufactured using any other conventional mechanism.

Each of the airfoil components 34A also includes carrier members 58 at the lateral sides of the end surfaces of the legs 54. The carrier members 58 extend longitudinally along the end surfaces. The carrier members 58 are spaced laterally and secured to the legs 54. The carrier members 54 may have a durometer harder than a durometer of the legs 54. The carrier members 58 and legs 54 may be manufactured through a dual or co-extrusion process. However, those having ordinary skill in the art will appreciate that the airfoil 34 may be manufactured using any other conventional mechanism.

Figure 15:
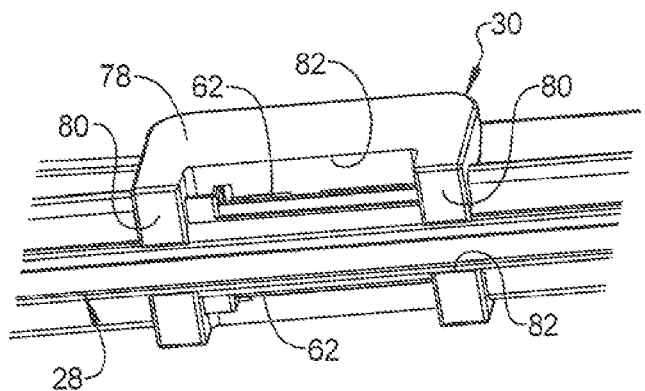
FIG. 15 is a bottom perspective view of a coupler and a portion of the heated wiper assembly according to one embodiment of the present invention.

The heated wiper assembly 26 includes at least one or more heating elements 60 to provide heat to the wiping element 28. In the embodiment illustrated, the heating elements 60 are heater or resistance wires extending longitudinally through the carrier members 58. The heating elements 60 are made of a resistive material to generate heat when power is applied. The heating elements 60 may be a single wire or a plurality of wires. In the embodiment illustrated, for each carrier member 58, one heating element 60 extends from a middle thereof to one end and another heating element 60 extends from the middle thereof to the other longitudinal end. The heated wiper assembly 26 includes a jumper 62 for each of the carrier members 58 to connect the ends of each of the heating elements 60 together at a middle thereof. The jumpers 62 are disposed underneath the coupler 30 and secured thereto as illustrated in FIG. 15.

As noted above, the heated wiper assembly 26 further includes a pair of end caps, generally indicated at 36 and according to one embodiment of the present invention. The end caps 36 are adapted to be disposed adjacent to the distal ends of the airfoil 34. The end caps 36 are secured to the airfoil 34 and beam 32 by a suitable mechanism such as press-fitting. The end caps 36 include a profile that substantially mimics the contours of the airfoil 34 to maintain the wind lift characteristics of the heated wiper assembly 26 and to provide an increased aesthetic value. The end caps 36 also provide a mass increase adjacent the distal ends of the airfoil 34 that prevent localized chatter along the extremities of the wiping element 28 caused by the combination of wind lift and a decrease in the force distributed to this area from the wiper arm 24 via the beam 32, as above-described.

Referring to FIGS. 9 through 12, each of the end caps 36 includes a body 62 and a spoiler 64 that tapers outwardly away from the body 62 toward a terminal point to define a profile that is slightly contoured. Each of the end caps 36 includes inwardly extending legs 66. Each of the end caps 36 also has a cavity, generally indicated at 68, defined by the body 62, spoiler 64, and legs 66 extending longitudinally inwardly from one end thereof. In the embodiment illustrated, each of the end caps 36 has a pair of carrier channels 70 extending longitudinally inward from the cavity 68 and spaced laterally. Each of the end caps 36 also include an aperture 72 extending inwardly from a bottom surface 74 thereof to communicate with the carrier channels 70. The aperture 72 is generally rectangular in shape. Each end cap 36 is a hollow piece made of a material such as plastic. Each end cap 36 is integral, unitary, and one-piece. It should be appreciated that the material is better at water repellant and good performance in winter weather.

The heated wiper assembly 26 also includes an end cap connector 76 for each end cap 36 to connect the longitudinal ends of the heater elements 60 together. The end cap connector 76 is generally rectangular in shape. The end cap connector 76 is disposed in the aperture 72 of the end cap 36. The end cap connector 76 has a pair of apertures tot shown) extending therethrough to receive the longitudinal ends of the heater elements 60. It should be appreciated that a tool (not shown) is used to crimp the end cap connector 76 and heater elements 60 together to make an electrical connection therebetween and prevent the heater elements 60 from exiting the apertures in the end cap connector 76. It should be appreciated that the end cap connector 76 is made of an electrically conductive material.

Figure 13:
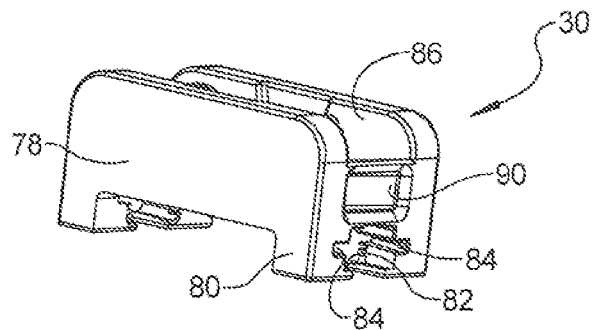
FIG. 13 is a side perspective view of a coupler of the heated wiper assembly according to one embodiment of the present invention.
Figure 14:
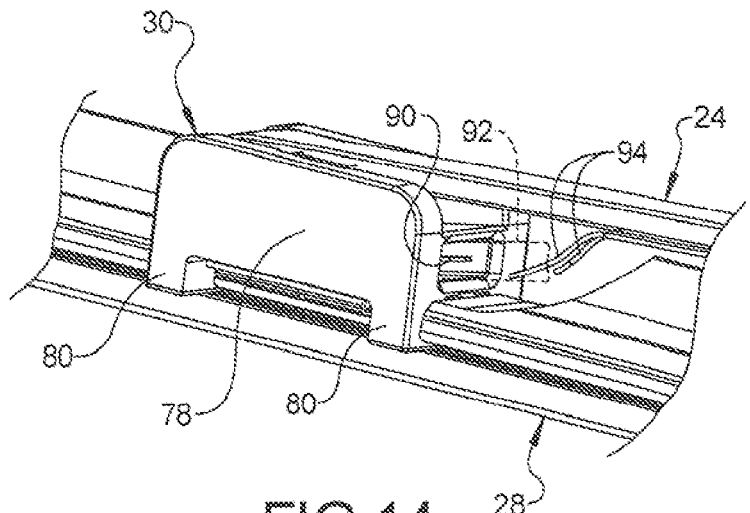
FIG. 14 is a side perspective view of a coupler and a portion of the heated wiper assembly according to one embodiment of the present invention.

Referring to FIGS. 13 through 15, the coupler 30 of the heated wiper assembly 26 includes a base 78 extending longitudinally and legs 80 depending from the base 78 to form a cavity 80 therein to hold the jumpers 62. The coupler 30 also includes an aperture 82 extending longitudinally through the legs 80 to allow the wiping element 28 to extend therethrough. The coupler 30 includes grooves 84 extending laterally from the aperture 82 into the legs 80 to allow the beam 32 to extend therethrough to secure the coupler 30 to the bean 32. The coupler 30 also includes a cavity 86 extending into the base 78 from an upper surface thereof to receive the adaptor 46 and secure it therein. The coupler 30 further includes an aperture 90 extending longitudinally through the side of the base 78 at one end and communicating with the cavity 86. The coupler 30 is made of a plastic material. The coupler 30 is integral, unitary, and one piece. It should be appreciated that the material is better at water repellant and good performance in winter weather.

The heated wiper assembly 26 also includes a coupler connector 92 to connect the jumpers 62 containing the middle ends of the heater elements 60 together. The coupler connector 92 extends through the aperture 90 and is partially disposed within the cavity 86 of the coupler 30 and connected to the jumpers 62 containing the middle ends of the heater elements 60 to allow the heater elements 60 to be connected to electrical wires 94 of a source of power. The coupler connector 92 is a two prong electrical connector. It should be appreciated that the electrical wires 94 extend along an undersurface of the wiper arm 24.

In operation, the heated wiper assembly 26 is connected to a source of power such as a direct current from an electronic controller (not shown). When the ambient temperature falls below 34 degrees F. as sensed by a sensor (not shown), power is applied to the heated wiper assembly 26. The direct current flows from the wires 94 to the coupler connector 92 and through the jumpers 62, heater elements 60, and end cap connectors 76 to create a closed loop electrical circuit. Since the heater elements 60 are made of a resistive material, they generate heat as a result of the current flowing therethrough. This heat radiates outwardly from the heater elements 60 and through the carrier members 58 adjacent to and contacting the upper portion 38 of the wiping element 28 to heat the hinge portion 42 and lower portion 40 (wipe lip) of the wiping element 28. The temperature output of the heater elements 60 is designed to reach a nominal temperature target of 150 degrees F., which will produce enough heat to resist or prevent snow and ice build-up on the wiping element 28. When the ambient temperature rises above 34 degrees F. as sensed by the sensor, power is discontinued to the heated wiper assembly 26.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A heated wiper assembly comprising:
    a wiping element adapted to contact a surface to be wiped;
    at least one elongated beam acting to support said wiping element;
    a pair of end caps operatively mounted to ends of said beam;
    an airfoil operatively mounted to said beam and extending between said end caps, said airfoil having a body with a recess extending inwardly from a bottom surface thereof to form legs having lateral sides extending longitudinally, said airfoil including a plurality of longitudinally extending carrier members spaced laterally and disposed in said recesses along said lateral sides; and
    a plurality of heating elements extending longitudinally through said carrier members along lateral sides of said airfoil adjacent said wiping element to provide heat to said wiping element to resist snow and ice build-up on said wiper assembly.

2. A heated wiper assembly as set forth in claim 1 wherein said heating elements comprise at least one wire.

3. A heated wiper assembly as set forth in claim 1 wherein each of said end caps include a recess extending therein.

4. A heated wiper assembly as set forth in claim 3 including at least one end cap connector disposed in said recess to connect electrically longitudinal ends of said heating elements.

5. A heated wiper assembly as set forth in claim 1 including a coupler adapted to connect said at least one elongated beam to a wiper arm.

6. A heated wiper assembly as set forth in claim 5 including at least one jumper to connect electrically said heating elements together and being disposed below said coupler.

7. A heated wiper assembly comprising:
    a wiping element adapted to contact a surface to be wiped;
    at least one elongated beam acting to support said wiping element;
    a pair of end caps operatively mounted to longitudinal ends of said at least one elongated beam;
    an airfoil operatively mounted to said at least one elongate beam and extending between said end caps, said airfoil having a body with a recess extending inwardly from a bottom surface thereof to form legs having lateral sides extending longitudinally, said airfoil including a plurality of longitudinally extending carrier members spaced laterally and disposed in said recess along said lateral sides;
    a plurality of heating elements extending longitudinally, one of said heating elements extending longitudinally through one of said carrier members and being disposed along one of said lateral sides of said airfoil adjacent said wiping element to provide heat to said wiping element to resist snow and ice build-up on said wiper assembly.

8. A heated wiper assembly as set forth in claim 7 wherein said carrier members contact said wiping element.

9. A heated wiper assembly as set forth in claim 7 wherein said heating elements comprise at least one wire.

10. A heated wiper assembly as set forth in claim 7 wherein each of said end caps include a recess extending therein.

11. A heated wiper assembly as set forth in claim 10 including at least one end cap connector disposed in said recess to connect electrically longitudinal ends of said heating elements.

12. A heated wiper assembly as set forth in claim 7 including a coupler adapted to connect said at least one elongated beam to a wiper arm.

13. A heated wiper assembly as set forth in claim 12 including at least one jumper to connect electrically said heating elements together and being disposed below said coupler.

* * * * *